(12) United States Patent
Keith

(10) Patent No.: US 6,464,068 B1
(45) Date of Patent: Oct. 15, 2002

(54) SCREW ASSEMBLY APPARATUS AND A METHOD OF USING THE SAME

(75) Inventor: Malcolm E. Keith, Algonquin, IL (US)

(73) Assignee: Midaco Corporation, Elk Grove Village, IL (US)

(*) Notice: Subject to any disclaimer, the term of this patent is extended or adjusted under 35 U.S.C. 154(b) by 0 days.

(21) Appl. No.: 09/542,184

(22) Filed: Apr. 4, 2000

(51) Int. Cl.[7] .............................................. B65G 33/04
(52) U.S. Cl. ...................... 198/467.1; 104/140; 104/167
(58) Field of Search ................ 198/467.1; 104/140–146, 104/167; 74/424.5, 424.71; 254/35; 187/267, 268

(56) References Cited

U.S. PATENT DOCUMENTS

| | | | | |
|---|---|---|---|---|
| 2,908,408 A | * | 10/1959 | Reed, Jr. ..................... 187/267 |
| 4,077,268 A | * | 3/1978 | Hill .......................... 74/424.71 |
| 4,921,218 A | * | 5/1990 | Andre ......................... 187/267 |
| 5,402,862 A | * | 4/1995 | Rosenkranz ................. 187/267 |
| 5,702,222 A | * | 12/1997 | Rosen ......................... 187/267 |
| 5,829,356 A | * | 11/1998 | Christiansson .............. 104/167 |
| 6,193,048 B1 | * | 2/2001 | Keith ....................... 198/465.1 |

* cited by examiner

Primary Examiner—Christopher P. Ellis
Assistant Examiner—Mark A. Deuble
(74) Attorney, Agent, or Firm—Patent+TMS, P.C.

(57) ABSTRACT

The present invention provides a screw assembly apparatus and a method of using the same. More specifically, a screw assembly apparatus is provided having a carriage attached to a nut assembly and a dog for engaging a workpiece. The carriage runs along the length of a screw within a carriage guide that may surround the nut assembly thereby protecting the nut assembly from debris and contamination. An opening may be contained within the carriage guide for the carriage to extend therefrom.

11 Claims, 3 Drawing Sheets

US 6,464,068 B1

SCREW ASSEMBLY APPARATUS AND A METHOD OF USING THE SAME

BACKGROUND OF THE INVENTION

The present invention generally relates to a screw assembly for positioning a carriage along a carriage guide. More specifically, the present invention relates to a screw assembly apparatus and a method of using the same that allow movement of a carriage along a carriage guide while protecting the interior of the carriage guide from debris.

It is, of course, generally known to employ a screw assembly to drive or to transfer a carriage along a length of the screw assembly. Further, known screw assemblies provide a sealing apparatus to protect the inside components of the screw assembly from debris and other contamination. Such debris may wear internal components of the screw assembly causing failure or malfunction of the screw assembly during operation.

Further, known screw assemblies may have the sealing apparatus disposed along the length of the carriage guide to prevent contamination of the inside components of the screw assembly. For example, a known sealing apparatus includes two pieces of overlapping rubber flaps disposed along the length of the screw assembly. The rubber flaps open and close around the carriage as the carriage moves longitudinally along the screw assembly. However, known sealing apparatuses may add to the cost and complexity of the screw assembly. Further, known sealing apparatuses may wear from frequent use and may ultimately, require replacement, causing additional operation costs.

Further, screw assemblies are known which use intermediate supports to prevent a screw within the screw assembly from bowing or otherwise losing its shape at high speeds. This is generally referred to as "whipping." More specifically, whipping may occur when the screw reaches certain critical speeds causing the length of the screw to bow and otherwise lose its shape thereby interfering with the carriage as the carriage attempts to move along the length of the screw. Further, whipping of the screw may cause damage to the screw assembly if the screw hits parts of the screw assembly as it is whipping. Intermediate supports that are used to prevent whipping may fix the screw in place; however, the known intermediate supports also add to the cost and complexity of the machine.

A need, therefore, exists for an improved screw assembly apparatus and a method of using the same that overcome the problems associated with currently known screw assembly apparatuses and methods.

SUMMARY OF THE INVENTION

The present invention provides a screw assembly apparatus and a method of using the same. More specifically, the present invention provides a screw assembly apparatus and a method of using the same that allows a carriage to move along a length of a screw and protects the internal parts of the screw assembly apparatus.

To this end, in an embodiment of the present invention, a screw assembly apparatus is provided. The apparatus has a screw having a length. A carriage guide is provided having an opening and further having a length wherein the carriage guide has an interior space inside the carriage guide wherein the screw is disposed within the interior space. A nut assembly has a bore-hole therethrough wherein the screw is disposed through the bore-hole and further wherein the nut assembly is contained within the interior space of the carriage guide. A carriage extends through the opening and attached to the nut assembly.

In an embodiment, the nut assembly engages the screw and moves along the length of the screw via a rotation of the screw.

In an embodiment, a rotator is associated with the screw assembly for rotating the screw.

In an embodiment, a rail is disposed along the length of the carriage guide within the interior of the carriage guide. A slot is provided in the nut assembly wherein the rail within the interior of the carriage guide fits within the slot in the nut assembly.

In an embodiment, the opening runs the length of the carriage guide.

In an embodiment, means is provided for limiting the movement of the carriage associated with the screw assembly.

In an embodiment, a dog is attached to the carriage extending from the carriage.

In an embodiment, the carriage guide has a bottom side wherein the opening is positioned on the bottom side of the carriage guide.

In an embodiment, a pad extends from the nut assembly engaging the nut assembly to the carriage guide.

In an embodiment, a spring engages the pad wherein the spring provides tension to the pad and further wherein the pad positions the nut assembly within the carriage guide.

In an embodiment, end caps are attached to the ends of the screw providing free rotation of the screw.

In an embodiment, the opening is disposed at a corner of the carriage guide.

In another embodiment of the present invention, a method for positioning a carriage is provided. The method comprises the steps of: providing a screw having threads and a length; engaging a nut assembly to the threads of the screw; providing a carriage guide having an opening and further having a length wherein the carriage guide has an interior space running the length of the carriage guide wherein the screw is disposed within the interior space wherein the carriage guide surrounds the nut assembly; disposing the screw through the nut assembly wherein the nut assembly is contained within the interior space of the carriage guide; and extending a carriage through the opening of the carriage guide wherein the carriage is attached to the nut assembly and further wherein the nut assembly moves along the screw assembly via a rotation of the screw.

In an embodiment, the opening runs the length of the carriage guide.

In an embodiment, a rotator is provided attached to the screw that rotates the screw.

In an embodiment, a limiter is attached to the carriage guide and limits the position of the carriage via the limiter.

In an embodiment, a pad extends from the nut assembly and positions the nut assembly within the carriage guide with a pad.

In an embodiment, the pad is tensioned with a spring, and the pad is forced against the carriage guide via the spring.

In an embodiment, a slot is provided in the nut assembly. A tab is provided on the carriage guide, and the tab is positioned on the carriage guide inside the slot in the nut assembly.

In an embodiment, a dog is attached to the carriage. A pallet having a slot is provided to engage the dog with the slot in the pallet. The pallet is moved by rotating the screw.

It is, therefore, an advantage of the present invention to provide a screw assembly apparatus and a method of using the same that allow a carriage to move longitudinally along a carriage guide.

A further advantage of the present invention is to provide a screw assembly apparatus and a method of using the same that prevent contamination of the inside of the carriage guide.

Yet another advantage of the present invention is to provide a screw assembly apparatus and a method of using the same that reduce the assembly cost of the screw assembly.

And another advantage of the present invention is to provide a screw assembly apparatus and a method of using the same that reduce the maintenance cost of the screw assembly by protecting internal components of the screw assembly from debris or other contamination.

A further advantage of the present invention is to provide a screw assembly apparatus and a method of using the same that provide intermediate support to the screw without the addition of supports to the screw assembly.

A still further advantage of the present invention is to provide a screw assembly apparatus and a method of using the same that allow a carriage to extend from an interior of a carriage guide through an opening on the bottom side of the carriage guide.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a screw assembly apparatus and a method of using the same. More specifically, the present invention relates to a screw assembly apparatus and a method of using the same that allow a carriage to move longitudinally along a spring while protecting the internal parts of the screw assembly.

Figure 1:
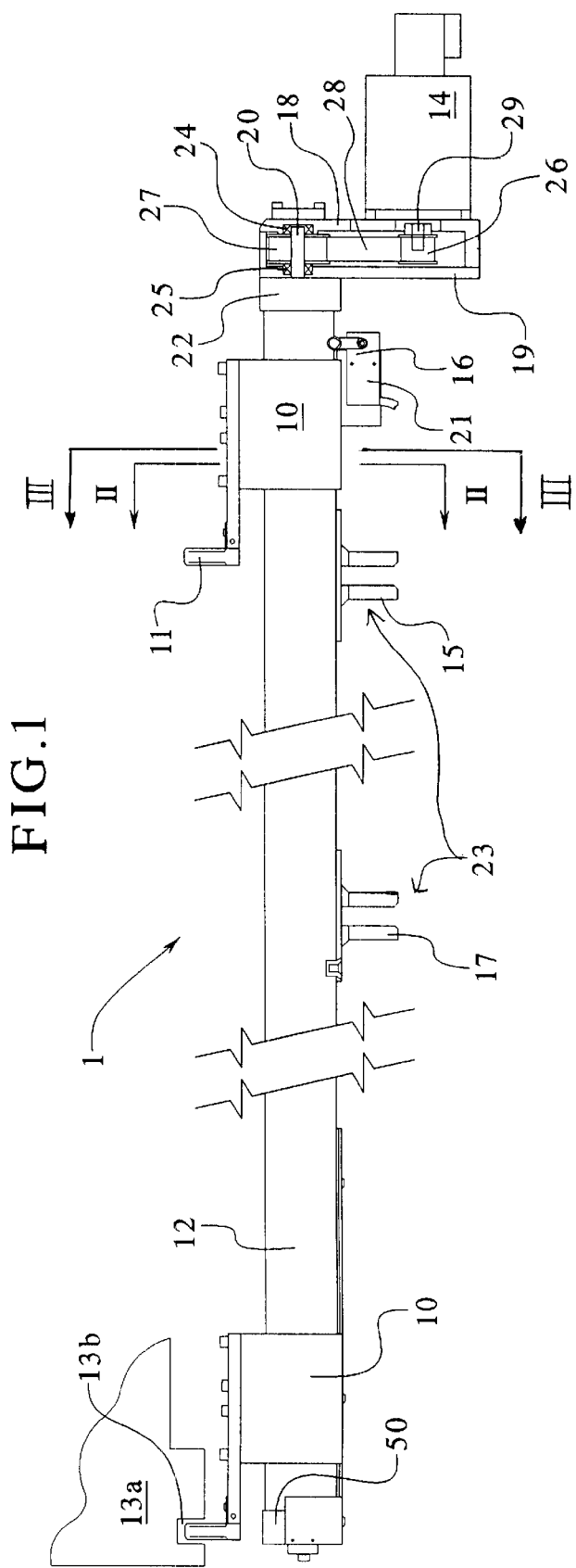
FIG. 1 illustrates a side view of an embodiment of a screw assembly, carriage and carriage guide of the present invention.
Figure 2:
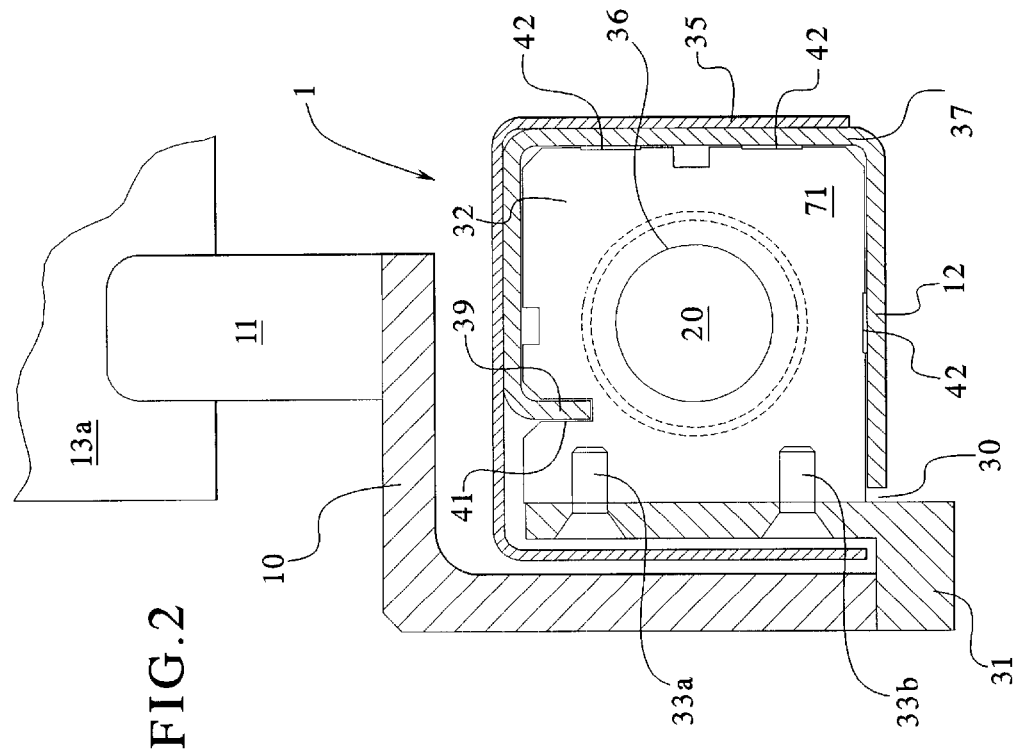
FIG. 2 illustrates a cross-sectional view of an embodiment of the screw assembly, carriage and carriage guide taken generally along the line II—II of FIG. 1.

Referring now to the drawings wherein like numerals refer to like parts, FIG. 1 illustrates a side view of a screw assembly 1 having a carriage 10 and a carriage guide 12. Generally, the carriage guide 12 may almost completely surround a screw 20 that may run through the interior of the carriage guide 12. The carriage 10 may be attached to a nut assembly 32 (as shown in FIG. 2) and may move along the length of the screw 20 as the screw 20 rotates.

FIG. 1 shows the carriage 10 on both ends of the screw 20. However, it should be noted that the carriage 10 may only be disposed at one position at any one time. FIG. 1 merely illustrates a range of movement for the carriage 10 along the screw 20.

A rotator 19 may be connected to the screw 20 at an end of the screw 20. The rotator 19 may contain a drive assembly 18 providing a connection between a motor 14 and the screw 20. The drive assembly 18 may transfer a rotation of the motor 14 to the screw 20, thereby turning the screw 20 at pre-determined speeds. The drive assembly 18 may contain pulleys 26,27, a belt 28, and a box cover 31 surrounding the pulleys 26,27 and the belt 28. The pulley 26 may be attached to the motor 14 at a shaft 29 that may extend from the motor 14. The pulley 27 may be operatively attached to the end of the screw 20. Further, the belt 28 may extend between the pulleys 26,27. The rotator 19 may be supported at bearings 24,25. Both of the bearings 24,25 may engage the screw 20.

A limiter 21 may be connected to the carriage guide 12 for limiting the movement of the carriage along the carriage guide 12. Extending from the limiter 21 may be a limit switch 16 that may provide positioning capabilities for the carriage 10 about the carriage guide 12. For example, if the carriage 10 approaches the rotator 19, the carriage 10 may engage the limit switch 16 thereby shutting the motor 14 down or otherwise stopping the rotation of the screw 20 to keep the carriage 10 from hitting the rotator 19.

Attached to the carriage 10 may be a dog 11 extending therefrom. The dog 11 may engage a pallet 13a and may move the pallet 13a along the length of the screw assembly 1. For example, the pallet 13a may contain a part to be machined in a machining center (not shown). The screw assembly 1 may move the pallet into and out of the machining center. Further, the screw assembly 1 may have a supporter 23 attached thereto having two pivots 15,17. Generally, the screw assembly may be rotated by the pivots 15,17 to align the dog into a slot 13b in the pallet 13a.

Referring now to FIG. 2, a cross-sectional view of an embodiment of the screw assembly 1 along the line II—II is shown. FIG. 2 further shows the carriage 10, the carriage guide 12 and a nut assembly 32 disposed within the carriage guide 12. The dog 11 may be attached to the carriage 10 and may engage the workpiece 13a or any other like item that may be apparent to those skilled in the art.

The carriage guide 12 may be composed of a first cover 35 and a second cover 37. The first cover 35 and the second cover 37 may be attached together via an adhesive or by welding or may be integrally formed as a single cover piece to form the carriage guide 12. The carriage guide 12 may include an opening 30 that is spaced between the first cover 35 and the second cover 37 that may be positioned along the length of the carriage guide 12. The extender 31 may extend from the carriage 10 through the opening 30 and may be attached to the nut assembly 32 by fasteners 33a,33b. Of course, any number of fasteners may be used to attach the extender 31 to the nut assembly 32, and this invention is not meant to be limited as herein described.

As shown in FIG. 2, the opening 30 may be disposed on a corner of the bottom side of the carriage guide 12 with the extender 31 and the carriage 10 extending around the carriage guide 12 to dispose the dog 11 over a top side of the carriage guide 12. Positioning the opening 30 on the bottom side of the carriage guide 12 may prevent debris and other contaminants from entering the carriage guide 12.

Figure 4:
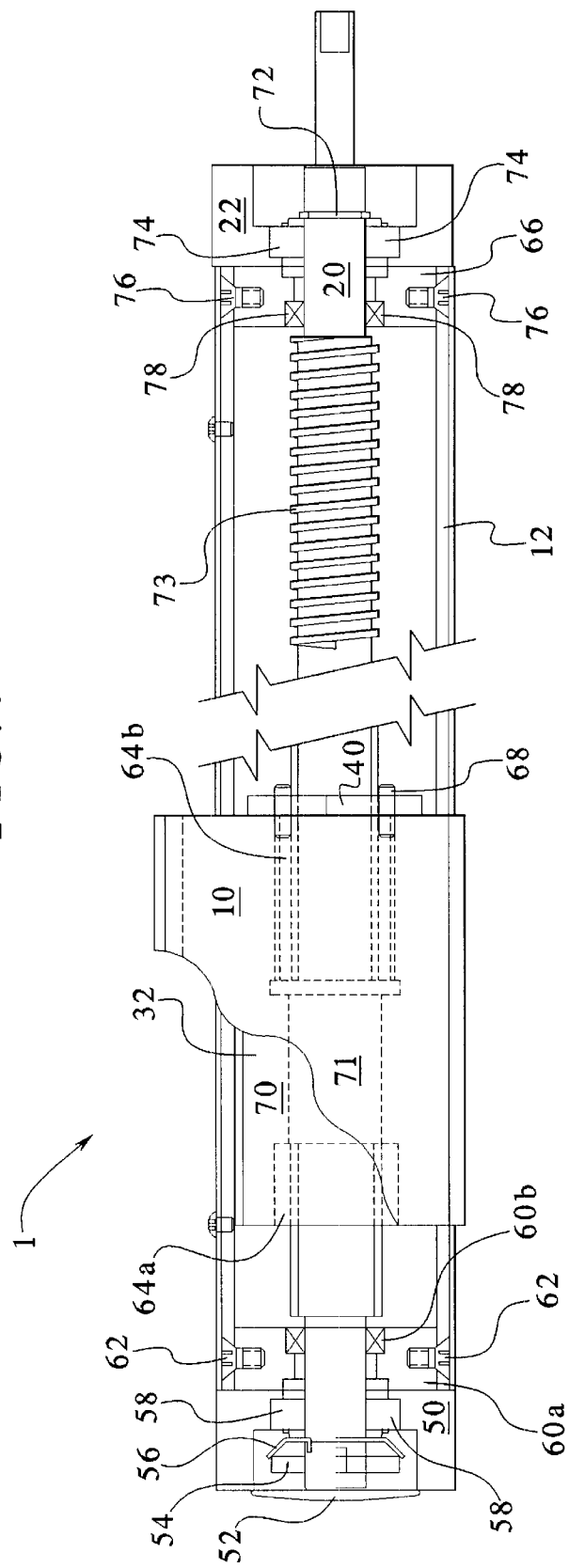
FIG. 4 illustrates a side view of an embodiment of the screw assembly, a partially sectioned carriage and a carriage guide of the present invention.

The second cover 37 may include an integrally formed tab 39 that may fit within the nut assembly 32 at a slot 41 formed in the nut assembly 32. The tab 39 may provide a track for the nut assembly 32 to follow as it travels inside the carriage guide 12. Further, the nut assembly 32 may contain a bore-hole 36 that may be bored through the nut assembly 32. The bore-hole 36 may be threaded (not shown) and may engage the threads 73 of the screw 20 (as shown in FIG. 4).

Figure 3:
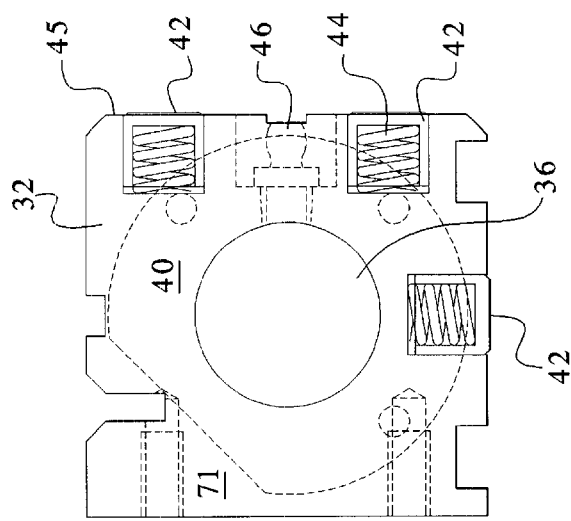
FIG. 3 illustrates a cross-sectional view of another embodiment of the nut assembly along the line III—III having springs and pads in an embodiment of the present invention.

FIG. 3 shows a cross-sectional view of the nut assembly 32 along the line III—III. The nut assembly 32 may have a nut insert 40 disposed therein that may provide support for the nut assembly. Further, the nut assembly 32 may have pads 42 having springs 44 contained therein. The plurality of springs 44 may provide outward tension to the pad 42 thereby positioning the nut assembly 32 inside the carriage guide 12. Of course, any number of pads may be contained within and extending from the nut assembly 32 that may be apparent to those skilled in the art to position the nut assembly inside the carriage guide 12.

As shown in FIG. 2, the pads 42 may slidably engage the inside of the carriage guide 12 providing positioning of the nut assembly 32 within the carriage guide 12. The pads may be constructed of a hard, resilient plastic material or any other material that may resist wearing. As the nut assembly 32 moves within the carriage guide 12, the pads 42 may engage the inside of the carriage guide 12 as shown in FIG. 2. Therefore, only the pads 42 may touch the inside walls of the carriage guide 12 preventing wear of the nut assembly 32 as the nut assembly 32 travels within the carriage guide 12. The pads 42 may be easily replaceable after the pads 42 have worn.

In addition, the nut assembly 32 may have at least one fitting 46. The fitting 46 may provide access to the bore-hole 36 thereby allowing lubricant to be applied through the fitting 46 into the bore-hole 36.

FIG. 4 illustrates a side view of an embodiment of the screw assembly 1, the partially sectioned carriage 10 and the cross-sectioned carriage guide 12. As shown in FIG. 4, the screw assembly 1 may have an end cap 50 that may fit over an end of the screw assembly 1 and may provide support for the screw 20 at an end of the screw assembly 1. The end cap 50 may include a cap 52 that may provide access to an inside of the end cap 50 when removed from the end cap 50. The end cap 50 may include a lock nut 54 and a lock washer 56 for providing support for the end of the screw 20 as the screw 20 fits within the end cap 50. Also, disposed within the end cap 50 may be a bearing 58. The end of the screw 20 may be unthreaded at the bearing 58 for providing free rotation of the screw 20 within the end cap 50 at the bearing 58.

Disposed adjacent the end cap 50 may be a seal 60a that may seal the end cap 50 thereby protecting the bearing 58 from contaminants that may interfere with the bearing 58 as the screw 20 rotates. The seal 60a may have a lip seal 60b that may be held tightly against the screw 20 for sealing the end cap 50. The lip seal 60b may be constructed of rubber, plastic or any other material that may effectively seal the end cap 50 to protect the internal components of the end cap 50 such as the bearing 58. The seal 60a may be attached to the carriage guide 12 of the screw assembly 1 via screws 62.

The nut assembly 32 may have the carriage 10 attached thereto (as shown partially cut-away in FIG. 4). The nut assembly 32 may include a nut 70 disposed along the entire length of the nut assembly 32. The nut 70 may contain an area of threads 71 that may engage the threads 73 of the screw 20. As the screw 20 rotates, the threads 73 may engage the threads (not shown) of the nut 70 thereby driving the entire nut assembly 32 and carriage 10 along the length of the screw 20.

A pair of nut plugs 64a, 64b may be provided within the nut 70 to provide support for the nut 70 at the ends of the nut 70. Further, the nut insert 40 (as shown in FIG. 3) may further provide support for the nut 70 and may connect the nut plug 64b to the nut 70 via dowels 68.

Disposed on an opposite end from the end cap 50 of the screw assembly 1 may be a second end cap 22. The second end cap 22 may include a retaining ring 72 for fixing the end of the screw into the drive end cap 22. A bearing 74 may be provided surrounding the end of the screw 20 for allowing free rotation and support of the screw 20 inside the drive end cap 22.

A seal 66 may be provided adjacent the drive end cap 22 having a lip seal 78 for sealing the drive end cap to prevent contaminants from entering the drive end cap 22. The screw 20 may not have threads so as to allow free rotation of the screw 20 within the drive 20. Further, the seal 66 may be attached to the carriage guide 12 via screws 76.

The screw 20 may be of sufficient length to drive the carriage 10 longitudinally along the carriage guide 12. Of course, the carriage guide 12 may be any length that may be apparent to those skilled in the art. Further, the screw 20 may have a diameter that may keep the screw from bowing or otherwise changing shape as the screw rotates at high speeds thereby eliminating a need for internal supports for the screw 20.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A screw assembly apparatus, the apparatus comprising:
   a screw having a length;
   a carriage guide having an opening and further having a length wherein the carriage guide has an interior space inside the carriage guide wherein the screw is disposed within the interior space;
   a nut assembly having a bore-hole therethrough wherein the screw is disposed through the bore-hole and further wherein the nut assembly is contained within the interior space of the carriage guide;
   a pad extending from the nut assembly engaging the nut assembly to the carriage;
   a spring engaging the pad wherein the spring provides tension to the pad and further wherein the pad positions the nut assembly within the carriage guide; and
   a carriage extending through the opening and attached to the nut assembly.

2. The apparatus of claim 1 wherein the nut assembly engages the screw and moves along the length of the screw via a rotation of the screw.

3. The apparatus of claim 1 further comprising:
   a rotator associated with the screw assembly for rotating the screw.

4. The apparatus of claim 1 further comprising:
   a tab disposed along the length of the carriage guide within the interior of the carriage guide; and
   a slot in the nut assembly wherein the tab within the interior of the carriage guide fits within the slot in the nut assembly.

5. The apparatus of claim 1 wherein the opening runs the length of the carriage guide.

6. The apparatus of claim 1 further comprising:

means for limiting the movement of the carriage associated with the screw assembly.

7. The apparatus of claim 1 further comprising:

a dog attached to the carriage extending from the carriage.

8. The apparatus of claim 1 wherein the carriage guide has a bottom side wherein the opening is positioned on the bottom side of the carriage guide.

9. The apparatus of claim 1 further comprising:

end caps attached to the ends of the screw providing free rotation of the screw.

10. The apparatus of claim 1 wherein the opening is disposed at a corner of the carriage guide.

11. A screw assembly apparatus, the apparatus comprising:

a screw having a length;

a carriage guide having an opening and further having a length wherein the carriage guide has an interior space inside the carriage guide wherein the screw is disposed within the interior space;

a nut assembly having a bore-hole therethrough wherein the screw is disposed through the bore-hole and further wherein the nut assembly is contained within the interior space of the carriage guide; and a carriage extending through the opening and attached to the nut assembly and wherein the opening is disposed at a corner of the carriage guide.

\* \* \* \* \*